(12) United States Patent
Kramer

(10) Patent No.: US 9,061,625 B2
(45) Date of Patent: Jun. 23, 2015

(54) VEHICLE FOR TRANSPORTING BALLAST WEIGHTS

(76) Inventor: Patrick Kramer, Loffingen (DE)

( * ) Notice: Subject to any disclaimer, the term of this patent is extended or adjusted under 35 U.S.C. 154(b) by 195 days.

(21) Appl. No.: 13/805,691

(22) PCT Filed: Jun. 20, 2011

(86) PCT No.: PCT/EP2011/003041
§ 371 (c)(1),
(2), (4) Date: Dec. 20, 2012

(87) PCT Pub. No.: WO2011/160804
PCT Pub. Date: Dec. 29, 2011

(65) Prior Publication Data
US 2013/0119007 A1    May 16, 2013

(30) Foreign Application Priority Data

Jun. 23, 2010 (DE) .......................... 10 2010 024 843

(51) Int. Cl.
*B66C 23/72* (2006.01)
*B60P 1/48* (2006.01)
*B66C 23/34* (2006.01)

(52) U.S. Cl.
CPC *B60P 1/48* (2013.01); *B66C 23/344* (2013.01)

(58) Field of Classification Search
USPC .................. 212/175, 180, 181, 301, 306, 195
See application file for complete search history.

(56) References Cited

U.S. PATENT DOCUMENTS

| 3,237,781 | A | * | 3/1966 | Heigl | 212/294 |
| 3,361,268 | A | * | 1/1968 | Pingon | 212/295 |
| 3,362,544 | A | * | 1/1968 | Wellnitz | 212/175 |
| 3,640,401 | A | * | 2/1972 | Pingon | 212/297 |
| 3,953,052 | A | * | 4/1976 | Palmcrantz | 280/763.1 |
| 4,660,731 | A | * | 4/1987 | Becker | 212/175 |
| 4,700,851 | A | * | 10/1987 | Reeve et al. | 212/181 |
| 5,120,186 | A | * | 6/1992 | Jorgenson | 414/686 |
| 5,690,240 | A | * | 11/1997 | Thiermann, Sr. | 212/180 |
| 5,842,589 | A | * | 12/1998 | Kroll et al. | 212/299 |
| 5,961,145 | A | * | 10/1999 | Schillinger et al. | 280/764.1 |
| 6,062,405 | A | * | 5/2000 | Pech et al. | 212/298 |
| 6,821,075 | B2 | * | 11/2004 | van der Horn | 414/462 |
| 6,840,540 | B2 | * | 1/2005 | Fugel | 280/763.1 |
| 7,686,174 | B2 | * | 3/2010 | Willim | 212/298 |
| 8,282,130 | B2 | * | 10/2012 | Fuegel | 280/765.1 |

FOREIGN PATENT DOCUMENTS

| DE | 1278708 | 9/1968 |
| DE | 9015296 | 7/1991 |
| DE | 19958691 | 6/2001 |

(Continued)

OTHER PUBLICATIONS

IGO MA 13 brochure of Manitowoc Crane Group (date unknown) (Admitted Prior Art).

(Continued)

*Primary Examiner* — Emmanuel M Marcelo
(74) *Attorney, Agent, or Firm* — Volpe and Koenig, P.C.

(57) ABSTRACT

A vehicle (1) for transporting ballast weights (4) which are intended for weighting a crane (2). The vehicle according to the invention is characterised in that the vehicle (1) has a ballast lifting device (5), by which the ballast weights (4) can be moved between a transport position located on the vehicle (1) and a usage position provided for on the crane (2).

19 Claims, 2 Drawing Sheets

(56) References Cited

FOREIGN PATENT DOCUMENTS

| | | |
|---|---|---|
| EP | 1031530 | 8/2000 |
| GB | 1415928 | 12/1975 |

OTHER PUBLICATIONS

Manitowoc Crane Group's IGO 32 Prospectus (date unknown) (Admitted Prior Art).

Prospectus of Manitowoc Crane Group, USA—IGO MA21 (date unknown) (Admitted Prior Art).

Prospectus of Manitowoc Crane Group, USA—IGO 50 (date unknown) (Admitted Prior Art).

Prospectus of Laxo Mekan AB, Sweden-Fifth Wheel Lifter (date unknown) (Admitted Prior Art).

Prospectus of Kramerkran (date unknown) (Admitted Prior Art).

* cited by examiner

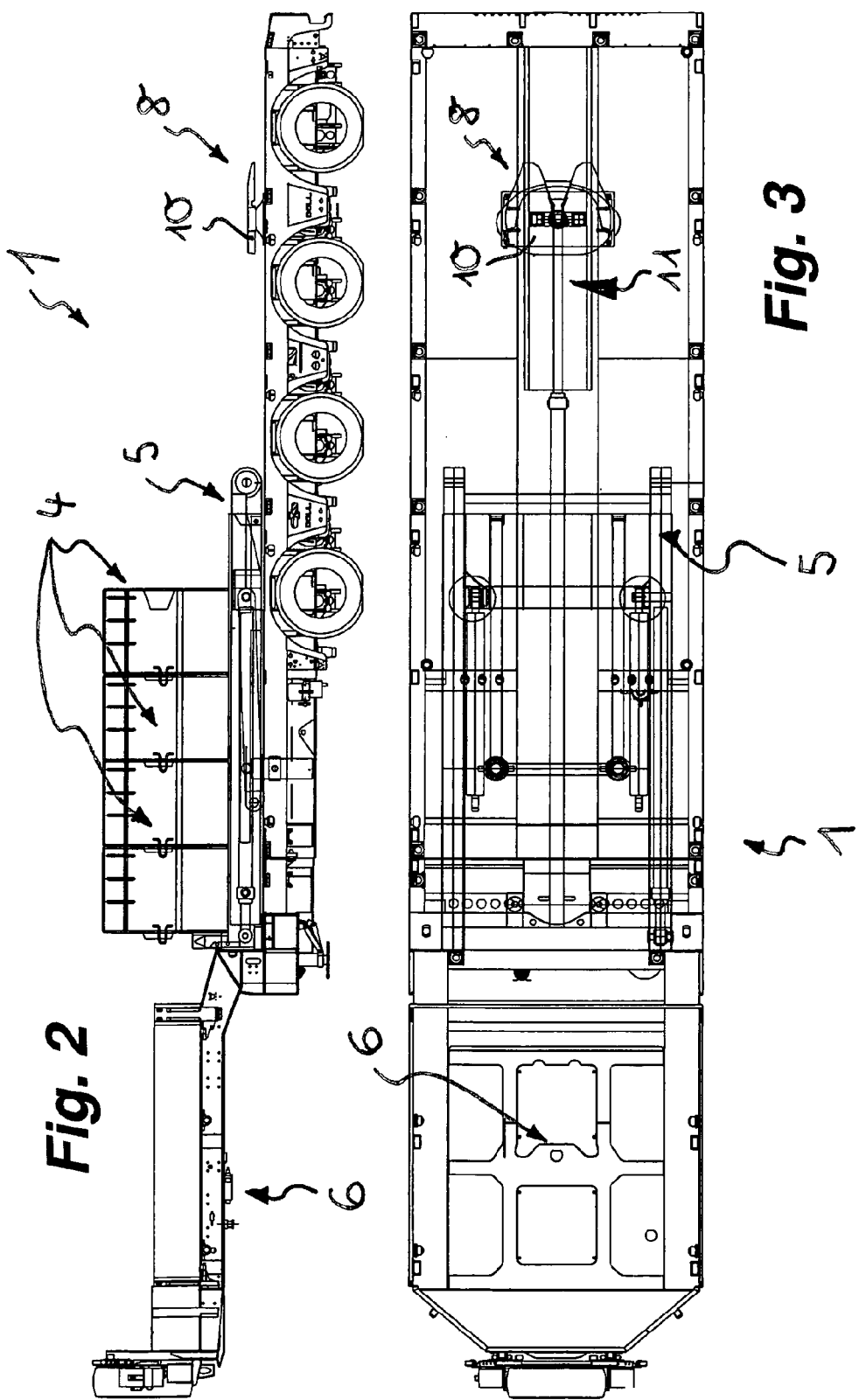

VEHICLE FOR TRANSPORTING BALLAST WEIGHTS

BACKGROUND

The invention relates to a vehicle that is configured for transporting at least one crane as well as ballast weights for weighting the crane, wherein the ballast weights can be moved between a transport position situated on the vehicle and a usage position provided on the crane.

Cranes are needed, for example, at construction sites to transport heavy and unwieldy loads there from the site of manufacture or delivery to the specified installation sites. Various cranes have already been provided, which can be moved in a more or less pre-mounted state to the particular construction site.

Thus, in the IGO MA 13 brochure of Manitowoc Crane Group, a U.S. firm, a crane is described that is fixedly mounted on a vehicle trailer with a tandem axle. The crane fixedly mounted on the vehicle trailer can thus also be moved quickly over widely dispersed routes to the particular construction sites. On the crane previously known, in the corner areas, crane support feet are provided, which can be lowered on the ground by means of integrated mechanical heavy-load winches so that the crane can be lifted and directed to the vertical, until the wheels provided on the tandem axle lift away from the ground. Fixed assembly of a complete chassis frame on the crane known previously known, and configuring this crane as a vehicle trailer, also involve considerable expenditure and high cost.

From Manitowoc Crane Group's IGO 32 prospectus, a crane is also already known that can be assembled into a transport position that places a transport axle configured as a tandem axle under the assembled crane and can be secured. On the end area facing a tractor cab, a trailer coupling is provided such that the crane, assembled and fixed so as to rest temporarily on the transport axle for carriage, can be moved practically as a semitrailer to the construction site. The previously-known crane having been placed at the construction site, aligned and put into operation, the transport axle is detached from the crane and temporarily stowed somewhere else at the construction site, until the transport axle again has to be mounted beneath the crane again as required for being hauled away. Since the transport axle cannot be moved solely for itself and advantageously employed otherwise, transportability involves considerable expense and high cost with this crane also. This expense is made still greater in that the required ballast weights must be driven separately by at least one additional person.

DE 90 15 296 U1 describes a vehicle configured as a mobile crane. The previously-known vehicle comprises a truck, which is configured in the manner of a tractor-trailer. On the truck, a revolving tower crane can be semi-mounted with its base frame in the manner of an interchangeable open body. To be able to load and unload the revolving tower crane from the truck, support arms deployable outward horizontally are provided on its base frame. So that the revolving tower crane belonging to the previously known vehicle can also lift loads over its outriggers situated on the frame, the crane frame is counterweighted with appropriate ballast weights. These ballast weights must be transported independently of the previously known vehicle and the revolving tower crane already found thereon with the aid of another vehicle, and then be transferred with difficulty from this other vehicle onto the crane frame and then shifted back.

From DE 1 278 708 A a transportable revolving tower crane with a chassis is known, which is equipped with a slewing track ring, with which the inner end of a simple mast consisting of multiple telescope-like deployable parts is connected, which carries an outrigger on the exterior end. This outrigger is balanced by a counterweight, which can be folded back onto the frame for transport by means of an arm that can pivot about a horizontal axis and can be locked with it. With the revolving tower crane previously known from DE 1 278 708 A, the counterweight is intended merely to balance the outrigger. Therefore, the counterweight can be configured to be small enough so that the counterweight stowed during transport beneath the frame in its direction transverse to the usual weight-carrying direction does not overload the frame. Especially with a larger revolving tower crane, to be able to balance loads lifted above its outriggers, additional ballast weights are possibly required, which however cannot be stowed and transported beneath the frame during travel. Therefore, transport of additional ballast weights makes an additional vehicle necessary with the revolving tower crane previously known from DE 1 278 708 A, wherein here also the ballast weights must then with difficulty be moved from this auxiliary vehicle to the revolving tower crane and placed. Since the counterweights intended to balance the outrigger are only able to be folded back onto the frame and locked with it, and since with the revolving tower crane previously known from DE 1 278 708 A no ballast-hoisting device is provided, by means of which ballasting weights could be moved and placed between a transport truck on the one hand and the revolving tower crane on the other, transport and assembly of the crane involves considerable expense with the revolving tower crane previously known from DE 1 278 708 A.

A movable tower crane is already previously known from GB 1 415 928 A, which has a non-rotating platform that is connected via a slewing track ring to a rotating platform, which rotating platform carries the crane pillar of the tower crane. In addition, the previously known tower crane exhibits a horizontal outrigger, a ballast and a front and rear pair of wheels that are attached to the non-rotating platform, on which support arms with hoisting devices are situated. To be able to move the previously-known tower crane with its full ballast both in a set-up state and in a folded up state over possibly uneven ground, without critical weight distributions occurring which could overload the wheels of the crane and could lead to their blocking and to premature wear, provision is made that a wheel frame with support wheels at a distance from an articulated axle is attached to the crane pillar, such that in the stowed position of the crane with a horizontally folded-up crane pillar the support wheels are placed on the ground behind the rear pair of wheels. Due to the chassis frame with the support wheels, the rear pair of wheels, which can constitute the driving wheels, are largely unloaded, so that the crane can easily be transported in self-propelled fashion not only in its set-up state, but also when stowed with its ballast.

A running gear unit is previously known from DE 199 58 691 A1 which is equipped with at least one wheel axle or wheels and is provided for a wide-overhang high-elevation crane, wherein the previously known running gear unit has a chassis frame to which the high-elevation crane is or can be attached. To significantly improve the maneuvring capabilities in constricted conditions at the set-up location, and also allow the previously-known running gear unit to move about the set-up location, the previously-known running gear unit is configured so that the high-elevation crane in maneuvring operations can be horizontally pivoted relative to the at least one wheel axle, and can be fixed in two or more different rotating positions relative to the chassis frame, wherein a plurality of wheel axles, which can be steered independently of each other, need to be provided on the chassis frame.

Also disadvantageous with these previously-known tower cranes and the running gear unit provided for them is that the chassis frame is mounted in a fixed fashion on the previously known crane, which involves considerable expense and high costs.

SUMMARY

Therefore the objective is to provide a vehicle of the type named initially, which substantially facilitates transport, set-up and dismantling of at least one crane and which is characterized by high cost-effectiveness.

The inventive solution to meet this objective provides, in the case of the vehicle of the type named at the beginning, that the at least one crane and the vehicle can be moved vertically relative to each other, that at least one crane support foot of the at least one crane is movable between a usage position lowered on the ground and a transport position elevated above the ground.

With the invention-specific vehicle, the ballast weights needed for the crane to be used are movable via a ballast hoisting device. With this, the ballast weights can be stowed during transport independent of the crane on the employed transport vehicle, to first be transferred at the utilization site from this vehicle to the revolving tower crane. In any case the vehicle is normally sufficiently stable to accept and transport heavy ballast weights. Since with the invention-specific vehicle the ballast weights are stowed during transport on the vehicle, it is possible without greater expense, and in an especially simple manner, to transport, set up and dismantle the at least one crane.

Since with the inventive vehicle, at least one crane support foot of the at least one crane is movable between a usage position lowered on the ground and a transport position elevated over the ground, only one vehicle is required to transport at least one crane and the ballast weights provided for weighting this at least one crane, for example to a site of usage. By this means, with the inventive vehicle, the easy transportation as well as set-up and dismantling of a crane that entail low expense are promoted, and cost effectiveness is increased still more.

To avoid complicated and time-consuming tie-downs of the crane on the vehicle, it is advantageous if, for detachable attachment of the at least one crane on the vehicle a coupling is provided, which has a coupling element on at least one crane, which acts in conjunction with a counter-coupling element assigned and situated on the vehicle.

A preferred embodiment form according to the invention makes provision for enabling quick anchoring of the at least one crane on the invention-specific vehicle and quick removal of the crane secured on the vehicle that the coupling is configured in the manner of a semitrailer coupling, and that the counter-coupling element provided on the vehicle is configured for this as a semitrailer coupling plate and the coupling element provided on the at last one crane is configured as a semitrailer fifth-wheel kingpin.

To alternately be able, for example, to use the inventive vehicle also to transport multiple cranes one behind the other to the places where they are used, and also to move variously dimensioned cranes on the inventive vehicle and for example to place them at the site of use, it is advantageous if the coupling is guided on the vehicle so as to be displaceable in the longitudinal direction of the vehicle and/or to be height-adjustable vertically in its relative position to the vehicle.

For the same reason it can be appropriate if the coupling is guided so as to be displaceable on the vehicle transversely with respect to the longitudinal direction of the vehicle.

One structurally simple and preferred embodiment form according to the invention makes provision that the ballast raising device has a pivot arm pivotably mounted on the vehicle, by means of which pivot arm ballast weights can be pivoted between a transport position situated on the vehicle and a usage position provided on the crane.

To be able to align the crane in its position relative to the vertical in simple fashion, it is advantageous if the crane has at least three support feet that are raisable and lowerable. If necessary, in this context, an additional crane support foot, held immovable on the crane, can also be provided, in so far as at least three crane support feet are configured such that they can be raised and lowered.

One preferred development according to the invention makes provision that these crane support feet can be deployed and/or pivoted by means of at least one linear and/or pivoting drive.

To set up the crane in its usage position quickly and with the least expense possible in terms of personnel, and to be able to align it in the desired position relative to vertical, a further development according to the invention makes provision that a control unit is provided, which is in a controlling connection with the at least one linear and/or pivoting drive in such a way that, preferably during the setting down of the support feet (3) on the ground, the crane can be placed automatically on the ground in the desired position relative to the vertical.

To also be able to mount a powerful and correspondingly heavy crane on the inventive vehicle, it is advantageous if the vehicle is configured as a vehicle trailer and especially as a semitrailer.

The crane can be set down directly in the area of the construction site with the aid of the vehicle, if the crane can be secured at the end area of the vehicle trailer which faces away from a trailer coupling.

To be able to attach the crane as much as possible to the end area of the vehicle trailer, it is advantageous if, in their transport position, the ballast weights can be placed and preferably secured at the end area of the vehicle trailer which faces the trailer coupling.

With the aid of the crane provided on the inventive vehicle, even heavy loads can be lifted and moved, if the crane is configured as a revolving tower crane.

The high cost-effectiveness of the inventive vehicle is promoted still further if at least two, optionally transportable cranes, possibly even of different types and/or from different manufacturers, are assigned to the vehicle.

To be able to place the crane at the desired site of usage with the aid of the inventive vehicle, even under restricted spatial conditions, it is advantageous if the vehicle trailer is configured as a self-propelled platform, preferably by means of an auxiliary engine.

Mobility of the vehicle trailer under restricted special conditions is promoted further if the vehicle trailer is configured as a separable trailer and/or as a telescoping trailer.

BRIEF DESCRIPTION OF THE DRAWINGS

Further features according to the invention are derived from the figures in connection with the specification and the figures. In what follows, the invention will be described in greater detail using a preferred embodiment example.

In the drawings

FIG. 2 shows the tractor and the vehicle trailer from FIG. 1, in a side view in which the crane has already been detached from the vehicle trailer; and FIG. 3 shows the vehicle trailer from FIGS. 1 and 2 in a top-down view.

DETAILED DESCRIPTION OF THE PREFERRED EMBODIMENTS

Figure 1:
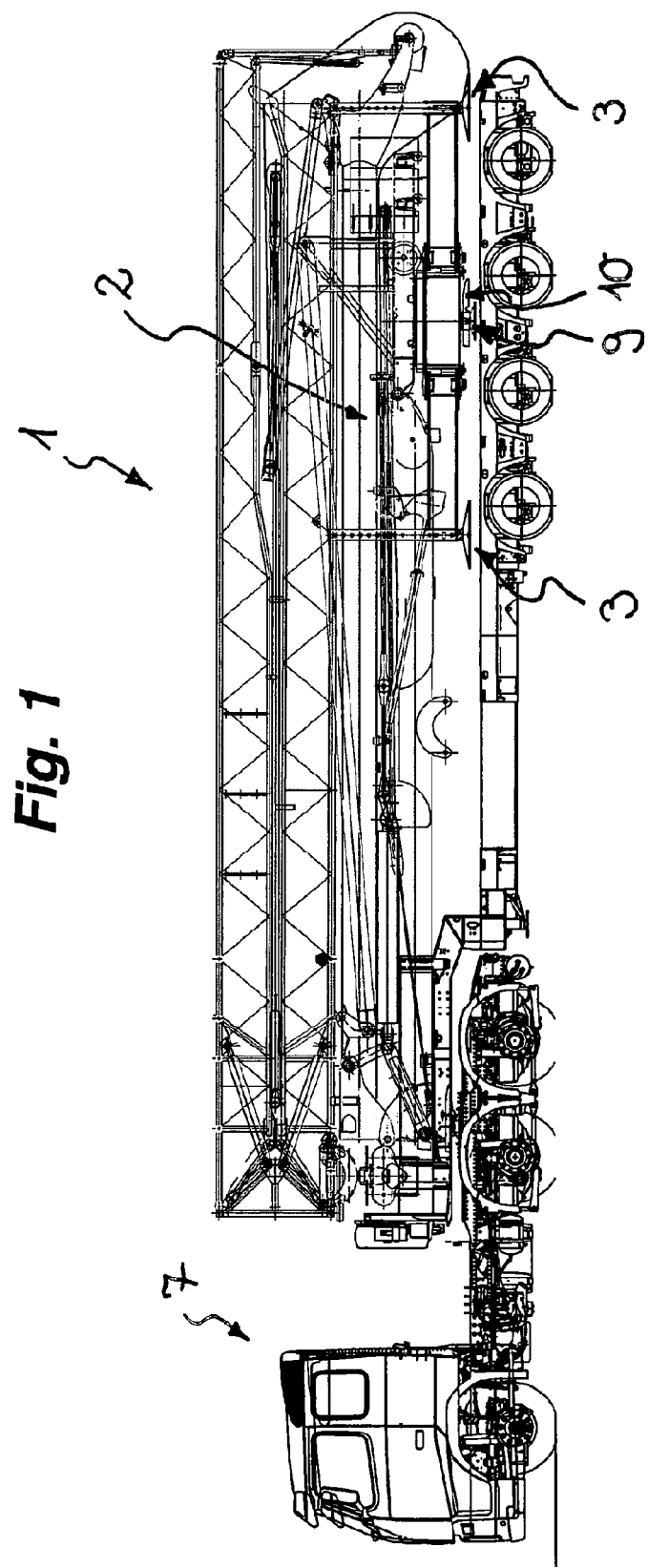
FIG. 1 shows a tractor with a vehicle trailer on which the crane is stowed folded into its transport position.

FIGS. 1 and 3 depict a vehicle 1 configured as a vehicle trailer and especially as a semitrailer, on which a crane 2 is detachably attached. The crane 2 and the vehicle 1 can be moved in a vertical direction relative to each other in such a way that at least one crane support foot 3 of crane 2 is movable between a usage position lowered onto the ground and a transport position raised above the ground. The ballast weights 4 needed in the usage position of the crane and shown in greater detail in FIG. 2 are movable by means of a ballast-raising device 5 between a transport position situated on the vehicle and a usage position provided on the crane.

For detachable attachment of the crane 2 on the vehicle 1, a coupling 8 is provided, which has at least one coupling element provided on the crane 2, which coupling element interacts with a counter-coupling element assigned and situated on the vehicle 1. While the counter-coupling element situated on the vehicle 1 is configured as a semitrailer coupling plate 10, the coupling element placed on the underside of the crane 2 is configured as a semitrailer fifth wheel kingpin 9. It is apparent from FIG. 3 that the counter-coupling element provided on vehicle 1 and configured here as a semitrailer coupling plate 10 is guided so as to be displaceable on the vehicle 1 by means of an adjusting mechanism 11. The counter-coupling element is guided so as to be displaceable in the longitudinal direction of the vehicle by means of adjusting mechanism 11 and in this way can be easily adapted to various cranes 2 having differing dimensions. In addition, it can be advantageous if the counter-coupling element found on the vehicle is also height-adjustable in the vertical direction in its position relative to vehicle 1. To be able to position precisely at the site of usage the crane which has been transported with the aid of vehicle 1, it is advantageous if the crane 2 is also able to be guided so as to be displaceable transversely with respect to the longitudinal direction of the vehicle with the aid of adjusting mechanism 11. The turning axis between the semitrailer coupling plate 10 of coupling 8 on the one hand, and the semitrailer fifth wheel kingpin 9 provided on the underside of crane 2 is preferably arranged on the turning axis of crane 2, with the results that the crane which by means of the adjusting device 11 guided so as to be displaceable in the X and Y direction and is also possibly height-adjustable in the Z direction can be positioned as precisely as possible at the site of usage and can be offloaded from vehicle 1 and set up.

The ballast raising device 5 has a pivoting arm pivotably mounted on vehicle 1, by means of which the ballast weights 4 are movable between a transport position situated on the vehicle and a usage position provided on the crane 2.

By comparing FIGS. 1 and 2 it can be perceived that the crane preferably has four raisable and lowerable crane support feet 3 which can preferably be deployed and/or pivoted out independently of each other by means of at least one linear and/or pivoting drive. A control unit that is not shown further here is assigned to the crane support feet 3, which control unit is in a control connection with the linear and/or pivoting drives of the crane support feet 3, in such a way that, preferably during the setting down of the crane support feet on the ground, the crane 2 can be placed automatically in the desired position relative to the vertical.

The vehicle 1 configured here as a semitrailer includes a trailer coupling 6 which is detachably connected to a tractor 7. Here the crane 2 is configured as a revolving tower crane and can also carry heavy loads. To increase cost-effectiveness, multiple cranes 2, possibly even of various types and/or from various manufacturers, are assigned to the vehicle 1, which cranes can optionally be transported on the vehicle 1. With the aid of the adjusting device 11, vehicle 1 can also be adapted to various, differently dimensioned cranes 2. The vehicle 1 depicted here and the crane 2 situated on it can readily be transported without any additional accompanying vehicle and especially without an accompanying vehicle intended for ballast weights. At the site of usage, by means of the control device the crane 2 can be simply and quickly offloaded and set up in its position relative to the vertical. Since the ballast weights 4 required in the usage position of crane 2 can be moved by means of the ballast-raising device 5, it is possible to provide the crane with ballast in its usage position even without an additional auto crane and without a crane boom on the revolving tower crane. The vehicle 1 can have a lifting aid, which variably configures the level of securing 8 of the crane, thus making it possible to lift and lower the crane 2. In the corner areas of its footprint, the crane 2 has crane support feet 3, which move the crane 2 into its usage position at an interval from the ground. In this usage position elevated from the ground, vehicle 1 can be moved under the crane 2 such that the crane 2 then can again be lowered onto the vehicle 1 and can be detachably attached there. On the crane support feet 3 a bracing surface can be provided which slides in and improves the securement of crane 2, especially under soft ground conditions.

The invention claimed is:

1. In combination, a vehicle (1) and at least one crane (2) along with ballast weights (4) intended for weighting a crane (2), comprising a ballast-raising device (5), by which the ballast weights (4) are movable between a transport position situated on the vehicle (1) and a usage position provided on the crane (2), the at least one crane (2) and the vehicle (1) are movable relative to each other in a vertical direction, such that at least one crane support foot (3) of the at least one crane (2) is movable between a usage position lowered onto the ground and a transport position elevated over the ground, wherein for detachable attachment of the at least one crane (2) on the vehicle (1), a coupling (8) is provided, configured as a semi-trailer coupling, which has at least one coupling element configured as a semitrailer fifth wheel kingpin (9) provided on the at least one crane (2), which interacts with a counter-coupling element, configured as a semitrailer coupling plate (10), situated on the vehicle (1), and the counter-coupling element on the vehicle (1) is guided so as to be displaceable in a longitudinal direction of the vehicle.

2. The combination as claimed in claim 1, wherein the ballast raising device (5) has a pivot arm pivotably mounted on the vehicle (81), said pivot arm is adapted to pivot the ballast weights between the transport position situated on the vehicle (1) and the usage position provided on the crane (2).

3. The combination as claimed in claim 1, wherein the vehicle (1) is configured as a vehicle trailer.

4. The combination as claimed in claim 1, wherein the crane (2) is detachably attached to an end area of a vehicle trailer facing away from a trailer coupling (6).

5. The combination as claimed in claim 1, wherein in the transport position the ballast weights (4) are stowed and secured on an end area of a vehicle trailer which faces a trailer coupling (6).

6. The combination as claimed in claim 1, wherein the crane (2) is configured as a revolving tower crane.

7. The combination as claimed in claim 1, wherein the at least one crane comprises two or more of the cranes (2) which are assigned to the vehicle.

8. The combination as claimed in claim 1, wherein the vehicle is a vehicle trailer is a self-propelled platform powered by an auxiliary engine.

9. The combination as claimed in claim 1, wherein the vehicle is a vehicle trailer is configured as a divisible trailer.

10. The combination as claimed in claim 1, wherein the vehicle trailer is configured as a telescoping trailer.

11. In combination, a vehicle (1) and at least one crane (2) along with ballast weights (4) intended for weighting a crane (2), comprising a ballast-raising device (5), by which the ballast weights (4) are movable between a transport position situated on the vehicle (1) and a usage position provided on the crane (2), the at least one crane (2) and the vehicle (1) are movable relative to each other in a vertical direction, such that at least one crane support foot (3) of the at least one crane (2) is movable between a usage position lowered onto the ground and a transport position elevated over the ground, wherein for detachable attachment of the at least one crane (2) on the vehicle (1), a coupling (8) is provided, configured as a semitrailer coupling, which has at least one coupling element configured as a semitrailer fifth wheel kingpin (9) provided on the at least one crane (2), which interacts with a counter-coupling element, configured as a semitrailer coupling plate (10), situated on the vehicle (1), and the counter-coupling element on the vehicle (1) is height-adjustable in a vertical direction in its position relative to the vehicle (1).

12. The combination as claimed in claim 11, wherein the counter-coupling element on the vehicle (1) is guided so as to be displaceable transversely with respect to the longitudinal direction of the vehicle.

13. In combination, a vehicle (1) and at least one crane (2) along with ballast weights (4) intended for weighting the crane (2), comprising a ballast-raising device (5), by which the ballast weights (4) are movable between a transport position situated on the vehicle (1) and a usage position provided on the crane (2), the at least one crane (2) and the vehicle (1) are movable relative to each other in a vertical direction, such that at least one crane support foot (3) of the at least one crane (2) is movable between a usage position lowered onto the ground and a transport position elevated over the ground, and the crane (2) has at least three raisable and lowerable crane support feet (3), and the crane support feet (3) can be raised and lowered independently of each other.

14. The combination as claimed in claim 13, wherein for detachable attachment of the at least one crane (2) on the vehicle (1), a coupling (8) is provided, which has at least one coupling element provided on the at least one crane (2), said coupling element interacts with a counter-coupling element situated on the vehicle (1).

15. The combination as claimed in claim 14, wherein the coupling (8) is configured as a semitrailer coupling, and the coupling element provided on the at least one crane is configured as a semitrailer fifth wheel kingpin (9) and the counter-coupling element provided on the vehicle (1) is configured as a semitrailer coupling plate (10).

16. The combination as claimed in claim 13, wherein the raisable and lowerable crane support feet (3) can be deployed or pivoted out by a linear drive.

17. The combination as claimed in claim 16, wherein a control unit is provided, which is in a controlling connection with the linear drive such that the crane can be placed automatically on the ground in a desired position relative to vertical.

18. The combination as claimed in claim 13, wherein the raisable and lowerable crane support feet (3) can be deployed or pivoted out by a pivoting drive.

19. The combination as claimed in claim 18, wherein a control unit is provided, which is in a controlling connection with the pivoting drive such that the crane can be placed automatically on the ground in a desired position relative to vertical.

* * * * *